US006880327B2

(12) United States Patent
Sabelström et al.

(10) Patent No.: US 6,880,327 B2
(45) Date of Patent: Apr. 19, 2005

(54) ARRANGEMENT AND METHOD FOR COMPRESSED AIR SYSTEMS IN VEHICLES

(75) Inventors: Mats Sabelström, Billdal (SE); Lucas Megas, Gothenburg (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/604,465

(22) Filed: Jul. 23, 2003

(65) Prior Publication Data

US 2004/0103644 A1 Jun. 3, 2004

Related U.S. Application Data

(63) Continuation-in-part of application No. PCT/SE02/00160, filed on Jan. 30, 2002, now abandoned.

(30) Foreign Application Priority Data

Feb. 2, 2001 (SE) .............................................. 0100312

(51) Int. Cl.[7] .............................................. F01N 5/04
(52) U.S. Cl. .............................. 60/280; 60/274; 60/299
(58) Field of Search ........................ 60/274, 280, 299, 60/39.45, 39.511; 55/290; 62/90; 95/96; 423/245.3

(56) References Cited

U.S. PATENT DOCUMENTS

| 3,908,367 | A | * | 9/1975 | Bauman | 60/280 |
| 4,122,673 | A | * | 10/1978 | Leins | 60/274 |
| 4,732,579 | A | * | 3/1988 | Veltman et al. | 95/96 |
| 4,744,213 | A | * | 5/1988 | El-Nashar | 60/39.45 |
| 5,013,340 | A | * | 5/1991 | Taslim et al. | 55/290 |
| 5,151,022 | A | * | 9/1992 | Emerson et al. | 423/245.3 |
| 5,182,086 | A | | 1/1993 | Henderson et al. | |
| 5,855,112 | A | * | 1/1999 | Bannai et al. | 60/39.511 |
| 5,927,084 | A | * | 7/1999 | Fielding | 62/90 |

FOREIGN PATENT DOCUMENTS

| DE | 19902052 A1 | 7/2000 | |
| GB | 2103593 A | 2/1983 | |
| GB | 2279584 A | 1/1995 | |
| JP | 06185856 A | * 7/1994 | F25J/3/08 |
| SE | 514089 C | 12/2000 | |
| WO | WO 0066251 A1 | 11/2000 | |

* cited by examiner

Primary Examiner—Tu M. Nguyen
(74) Attorney, Agent, or Firm—Novak Druce & Quigg LLP

(57) ABSTRACT

Method and arrangement for providing a compressed air system in a vehicle including a compressor (2) for generating compressed air and a connection (11) for feeding compressed air generated by the compressor (2) to the remaining compressed air system (1) in the vehicle. An oxidation catalyst (10) which is adapted for purifying the generated compressed air in direct connection with an outlet of the compressor (2), and that the oxidation catalyst (10) is connected to the remaining compressed air system (1).

14 Claims, 3 Drawing Sheets

ARRANGEMENT AND METHOD FOR COMPRESSED AIR SYSTEMS IN VEHICLES

CROSS REFERENCE TO RELATED APPLICATIONS

This present application is a continuation-in-part patent application of International Application No. PCT/SE02/00160 filed Jan. 30, 2002, now abandoned, which was published in English pursuant to Article 21(2) of the Patent Cooperation Treaty, and which claims priority to Swedish Application No. 0100312-8 filed Feb. 2, 2001. Both applications are expressly incorporated herein by reference in their entireties.

BACKGROUND OF INVENTION

1. Technical Field

The present invention relates to an arrangement for a compressed air system in a vehicle that includes a compressor for generating compressed air and a connection for feeding compressed air generated by the compressor to the remaining compressed air system in the vehicle. The invention is particularly intended to be utilized in the provision of compressed air systems in heavy goods vehicles.

The invention also relates to a method for providing compressed air system in a vehicle including the steps of generating compressed air by means of a compressor and feeding the compressed air generated by the compressor to the remaining compressed air system in the vehicle.

The invention also relates to a device for generating and purifying compressed air that includes a compressor and an oxidation catalyst.

2. Background of the Invention

Many types of vehicles are know that are equipped with a compressed air system for generating, storing and distributing compressed air to, for example, air suspension systems. and brake systems. These systems typically include pressure tanks, compressed air lines and various types of valves that are supplied with compressed air from an air compressor that is operated by the vehicle's combustion engine. For lubricating the compressor, lubricating oil from the lubricating oil system of the combustion engine is normally utilized.

Conventionally, the compressed air can be fed from the compressor to the vehicle's compressed air system. One problem which occurs in connection with previously known compressed air systems of the above-mentioned type, is related to the fact that the compressed air which is generated in the compressor often is contaminated with lubricating oil in the aerosol and gaseous states. When the compressor is in operation, a very high temperature occurs that can result in oxidation of the lubricating oil which is mixed into the compressed air. This can result in polymerization of the oil and in the formation of aggressive oxidation products. If these pollutants are conveyed to the vehicle's remaining compressed air system, undesirable coatings can be formed in the system's components. These coatings can cause choking and material dissolution of the components, which in turn can compromise the functionality of the affected components.

In accordance with the prior art, the compressed air generated in the air compressor can be purified by means of a mechanical filter, combined with cooling. One drawback regarding this technique, however, is that is has low efficiency.

Another previously known system for purifying compressed air is shown in the Swedish patent application 9901355-9. This document discloses a system with a compressor and a separate oxidation catalyst that is connected with the compressor via a special line. By means of the oxidation catalyst, the compressed air generated in the compressor can be purified, which reduces the risk of accumulation of pollutants in the vehicle's compressed air system. One drawback of this system, however, is that it requires a comparatively large space that becomes a problem since the available space in an engine house of a heavy goods vehicle is considerably limited. Another factor that must be taken into consideration is that the oxidation catalyst requires a comparatively high temperature in order to obtain normal purification effects.

SUMMARY OF INVENTION

An objective of the present invention is to provide an arrangement for an efficient purification of compressed air in a compressed air system for a vehicle; in particular, a compressed air system where the compressed air is generated by a compressor that is lubricated with lubricating oil from a combustion engine.

The above-mentioned objective is achieved by means of an arrangement in which an oxidation catalyst is adapted for purifying the generated compressed air in direct connection with an outlet of the compressor; and further, the oxidation catalyst is connected to the remaining compressed air system.

Another objective of the invention is to provide an improved method for a compressed air system in a vehicle. This is achieved by a method that includes purifying the generated compressed air in an oxidation catalyst in direct connection with an outlet of the compressor and then feeding the compressed air that has been purified by the oxidation catalyst to the remaining compressed air system.

An additional objective of the invention is to provide an improved device for generating and purifying compressed air in which an oxidation catalyst is adapted for purifying the generated compressed air in direct connection with an outlet of the compressor.

By means of the invention, several advantages are achieved. Primarily, it can be noted that the inventive arrangement requires a considerably smaller space than previously known arrangements. This implies that the oxidation catalyst that is utilized in the invention can be formed with a volume which is sufficiently large for providing a satisfactory purification effect for the compressed air from the compressor. This is in turn based on the understanding that the purification effect of the oxidation catalyst in principle is proportional to its volume.

Another advantage of the present invention(s) is that the oxidation catalyst can be positioned in direct connection with the compressor. This implies that the operating temperature that is required for the oxidation catalyst (normally at least 200° can be obtained in a reliable manner without the need of having to use any particular heat aggregates. This also avoids the need of utilizing any particular heat insulation or the like for maintaining the required high operating temperature of the compressed air being fed from the compressor.

According to a preferred embodiment of the invention, the oxidation catalyst is provided in the cylinder head of the compressor, which thus implies that an arrangement configured according to this embodiment of the invention can be the to constitute an integrated compressor and catalyst device which constitutes a compact and space-saving unit that performs the functions both of a compressor and a catalyst.

BRIEF DESCRIPTION OF DRAWINGS

The invention will be further described in the following with reference to a preferred embodiment and to the annexed drawings, in which.

DETAILED DESCRIPTION

Figure 1:
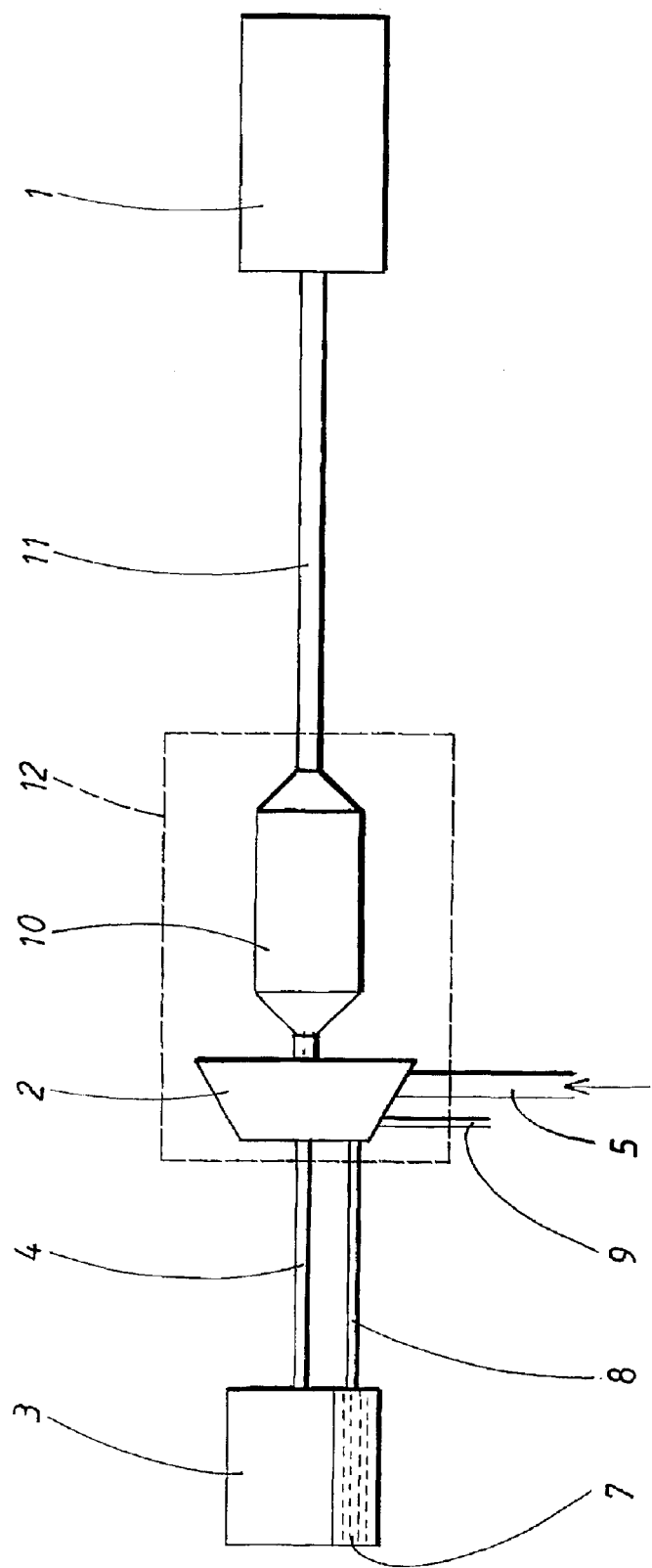
FIG. 1 is a schematic view of an arrangement configured in accordance with the teachings of the present invention.

FIG. 1 shows a schematic view of an arrangement configured according to the present invention. According to a preferred embodiment, the arrangement is utilized in connection with a compressed air system 1 which is preferably constituted by a compressed air system for a heavy goods vehicle. The compressed air system 1, which comprises for example an air dryer, a pressure tank and the vehicle's air suspension system and brake system, is only schematically shown in FIG. 1.

The compressed air that is intended for the compressed air system 1 is generated in a compressor 2 that is mechanically connected with a combustion engine 3 via a transmission 4. In this manner, the air that flows from the atmosphere, according to what is indicated by means of an arrow in the drawing, and to the compressor 2 via an incoming air channel 5, can be compressed and fed out from the compressor 2. The compressor 2 is provided with lubricating oil from the lubricating oil system 7 of the combustion engine 3, wherein the lubricating oil is fed into the compressor 2 via an oil feed line 8 and fed out from the compressor 2 via an oil exhaust line 9.

When the compressor 2 is in operation, a very high temperature is generated in the compressed air that is generated in the compressor. This in turn results in oxidation of the lubricating oil that is mixed into the compressed air. The aggressive oxidation products that in that connection are formed, e.g. esters, resin-like substances and aerosol, may contaminate the compressed air being generated in the compressor 2. If this contaminated air should be fed further to the compressed air system 1, coatings on pressure tanks and the like can be formed. Furthermore, it can further cause choking of valves and material dissolution of components forming part of the system. To this end, the contaminated compressed air is guided from the compressor 2 to an oxidation catalyst 10 that is provided in connection with the compressor 2. In the oxidation catalyst 10, the pollutants forming part of the compressed air will be transformed into carbon dioxide and water. Next, the purified compressed air will be fed further to the compressed air system 1 by means of an additional line 11.

According to what will be described in detail below, the invention is, at least in part, based on the fact that the oxidation catalyst 10 is provided in direct connection with the compressor 2. Preferably, the oxidation catalyst 10 is positioned in connection with an outlet for compressed air at the compressor 2, which implies that the compressor 2, together with the oxidation catalyst 10, can be the to constitute a combined compressor and catalyst device, which device is indicated by means of dashed lines and is generally designated with the reference numeral 12 in FIG. 1.

The oxidation catalyst 10 is constructed in such manner that it has a certain minimum limit temperature at which it is capable of operating with a satisfactory purification capacity. This limit temperature is normally of the order of approximately 200° C. In a normal application, the temperature of the air flowing out from the compressor 2 will obtain this temperature. However, in order to secure the desired limit temperature, the invention according to an alternative embodiment can be arranged with special means for heating. This can in turn be realized by providing the oxidation catalyst 10 with an electric heating device, by means of which it can be assured that the desired temperature of the oxidation catalyst 10 always can be obtained. In order to secure that the temperature of the oxidation catalyst 10 will not become too high, the invention can alternatively also be provided with a cooling system, for instance, that is based on cooling water, which is utilized for cooling the oxidation catalyst 10 during those operating conditions where its temperature runs the risk of becoming too high. To this end, the line 11 can also be adapted so that the air that flows through the line 11 is cooled. It shall be noted, however, that for most applications, a correct operating temperature can be obtained in the oxidation catalyst 10 without the need of having to use any particular device for temperature control.

Figure 2:
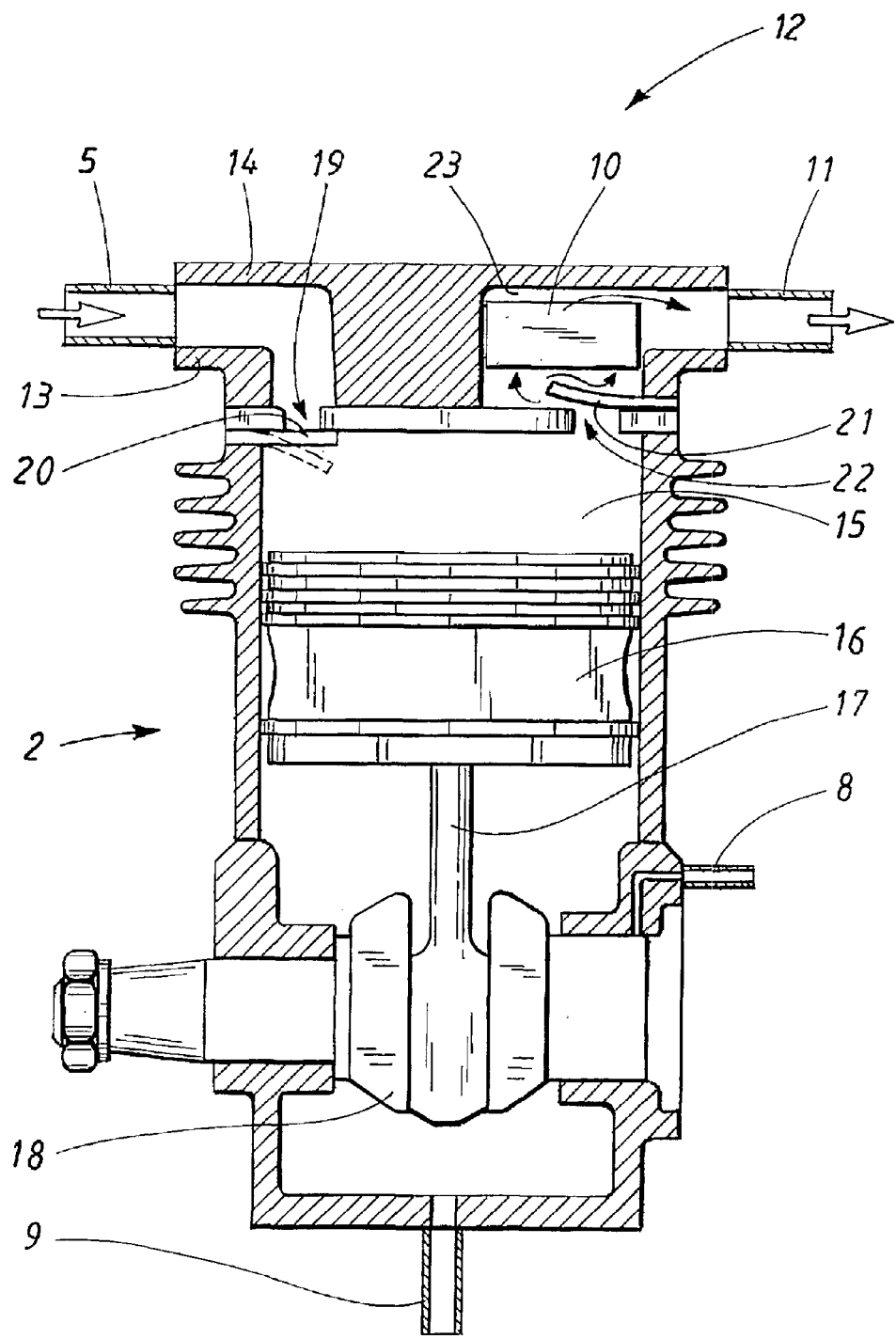
FIG. 2 is a partial cutaway, partial cross-sectional view of a compressor configured in accordance with the invention.

FIG. 2 shows a slightly simplified cross-sectional and cutaway view of a combined compressor and catalyst device 12 configured according to the present invention. This device 12 comprises (includes, but is not limited to) a compressor 2, the main parts and function of which will now be described.

The compressor 2 comprises a case 13 with a cylinder head 14. Inside the case, there is a cylinder 15 in which an upwardly and downwardly moving piston 16 is provided. The piston 16 is in a known manner connected with a connecting rod 17 that in turn is provided on a crankshaft 18. This crankshaft 18 is rotatably mounted in the case 13 and is connected with the combustion engine via a mechanical transmission.

Incoming air is fed to the compressor 2 via the incoming air channel 5. During a downward movement of the piston 16, air is fed into the cylinder 15 via an admission 19. This admission or passage 19 is normally covered by a lamella-based (reed-type) admission valve 20. However, the admission valve 20 is opened in a known manner due to a decrease of pressure in the cylinder 15, which is obtained during the downward movement of the piston 16. The opened condition of the admission valve 20 is indicated by means of dashed lines in FIG. 2.

When the piston 16 has reached its lowest position and begins its upward motion, the admission valve 20 is first closed. When the piston 16 is pressed upwards, the air in the cylinder 15, which is now compressed, will be pressed out via a lamella-based exhaust valve 21, which in FIG. 2 is shown in the opened condition which it adapts automatically due to an increased pressure which prevails in the cylinder 15. Thus, in this opened condition, the compressed air can flow out through an outlet 22.

The above-mentioned oil feed line 8 is connected to the compressor 2 for supplying lubricating oil, whereas the above-mentioned oil exhaust line 9 also is connected to the compressor 2, for removing lubricating oil.

In the cylinder head 14 of the compressor 2, a space 23 is defined through which the outgoing air from the compressor 2 flows before it reaches the outgoing line 11 which leads to the vehicle's remaining compressed air system as depicted in FIG. 1. According to the above description, a basic principle of the present invention is that an oxidation catalyst is provided in direct connection with the compressor 2, more precisely in connection with its air outlet 22. This oxidation catalyst is indicated in FIG. 2 in the form of a catalyst unit 10 being provided downstream of the air outlet 22. The oxidation catalyst can in turn be constituted by one single catalyst unit, or by several smaller catalyst units that together correspond to the oxidation catalyst indicated schematically in FIGS. 1 and 2 by the reference numeral 10.

The catalyst unit 10 is formed in such manner that it fits into the space 23 that is defined in the cylinder head 14. The catalyst unit 10 can for example be constituted by several smaller units that are essentially cylindrical and tube-like.

The invention is, however, not limited to this illustrated design, but the catalyst unit 10 is formed depending on available space, flow characteristics of the compressed air in the compressor's cylinder head 14 and the possibility for service. Preferably, the oxidation catalyst is formed so that it completely utilizes the space 23 that is defined in cylinder head 14 and so that the compressed air will flow evenly through it.

All in all, the catalyst unit thus constitutes an oxidation catalyst that is utilized for purifying the air flowing out from the cylinder 15, before it is fed further through the line 11 to the compressed air system 1. In this manner, there will be a reduced risk of harmful coatings causing choking or damages on components in the compressed air system.

A basic principle of the invention is that an oxidation catalyst is provided in direct connection with the outlet 22 of the compressor 2 so that a combined compressor and catalyst device is formed. This combined device comprises an oxidation catalyst that in turn is constituted by at least one, but alternatively also several catalyst units that each one in a catalytic manner is capable of purifying a certain amount of compressed air generated in the compressor 2. Preferably, the catalyst unit, and alternatively the catalyst units, can be constituted by short tube-like units, and each one is formed with a folded plate being coated with a catalytically active material. These catalyst units are positioned in the cylinder head 14 so that the air from the cylinder 15 is guided through the catalyst units. The direction of flow for the compressed air through the catalyst unit 10 and the space 23 in the cylinder head 14 is indicated schematically by means of arrows in FIG. 2.

For mounting the catalyst unit 10 (alternatively the catalyst units), the cylinder head 14 preferably comprises guiding means, which can, for example, be constituted by suitably formed recessions in which a catalyst unit can be pushed into place during manufacture or during service of the compressor 2. In this manner, the catalyst unit 10 can be mounted in the cylinder head 14 in a simple manner. In case of several units being utilized, they can suitably be formed as small short tubes, which results in their being formed as easily exchangeable units that can be pushed into place in corresponding recessions or similar spaces in the cylinder head 14. In this manner, an advantage is obtained as regards the invention since, for example, a defective catalyst unit can be exchanged in a simple manner.

By means of the disclosed invention, an improved purification capacity is obtained by the way in which the oxidation catalyst 10 is arranged in direct connection with the compressor 2. This results in the elimination of separate, long connection lines between the components. In this manner, the oxidation catalyst will also obtain its required operating temperature without any unnecessary heat losses along the way between the compressor and the oxidation catalyst. By means of the arrangement according to the invention, a smaller volume compared with previously known devices is also obtained.

The invention is not limited to comprise a certain number of catalyst units, but this number can be varied depending on the instant application and depending on the available dimensions of catalyst units, cylinder head and other components. In principle, the invention can be realized with one single catalyst body that fills out the interior of the cylinder head 14 in a suitable manner. Alternatively, the invention can be realized with several catalyst units that in that case can be mounted individually in the cylinder head.

At least one embodiment of the invention is not limited to the oxidation catalyst being provided in connection with the cylinder head 14 of the compressor 2. According to an alternative embodiment, the exhaust valve 21, particularly an under side thereof, can be coated with a material which provides the function of an oxidation catalyst. This has a certain purifying effect on the air flowing past the exhaust valve 21. The upper side of the piston 16 may also be coated with a catalytic material, by means of which the catalytic surface can be increased without the need of having to increase the size of the compressor.

Depending on the required or desired application, the invention can alternatively be formed with means for cooling the purified compressed air, wherein the means in that case are provided along the connection 11 between the oxidation catalyst and the remaining compressed air system 1, as shown in FIG. 1. In this manner, the temperature of the compressed air can be reduced to a value that is adjusted to the compressed air system 1 being arranged downstream.

Figure 3:
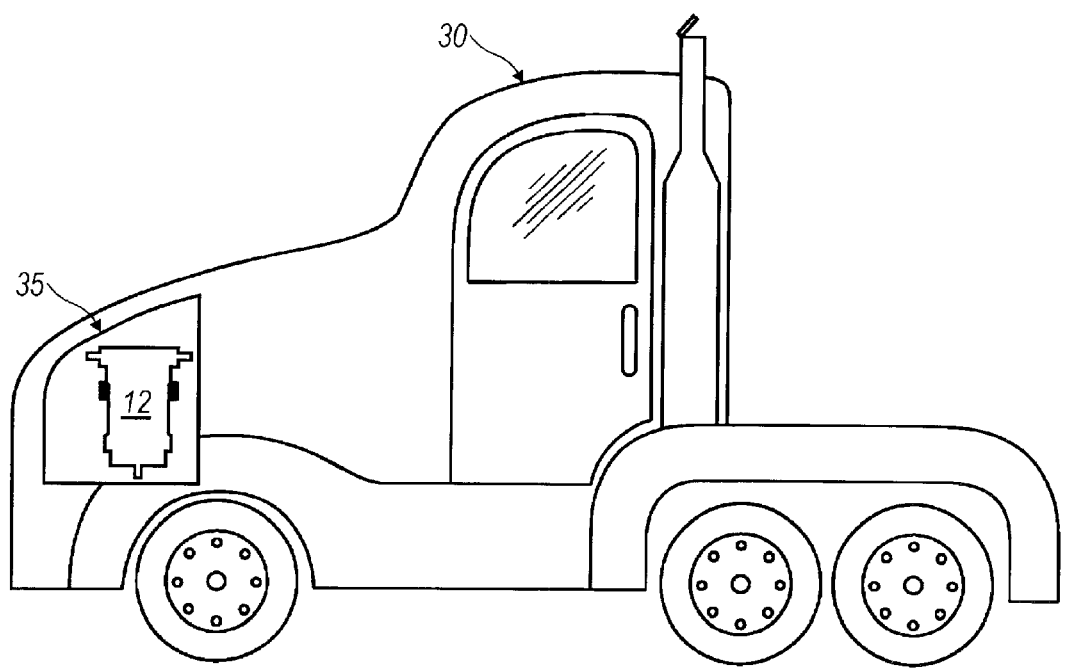
FIG. 3 is a schematic view of a vehicular transported compressor that integrally incorporates a catalyst within the compressor.

FIG. 3 illustrates the previously intimated embodiment of the invention that addresses the establishment of a vehicular transported compressor 12 that integrally incorporates a catalyst 10 within the compressor 2. The arrangement of this embodiment is expressly based in a vehicle 30 provided with a receiving space 35 for a catalyzing air compressor 12. The receiving space 35 is configured in such a manner that it most advantageously accommodates an integrally constructed air compressor 2 with an integral oxidation catalytic treatment stage 10,23. In this configuration, a catalyst 10, which can take the modularized form described hereinabove, is confined within the space 23 defined within the air compressor and is provided for purifying generated air. More specifically, as illustrated, the catalyzing air compressor 12 has a cylinder-defining body that is located in the receiving space 35. The cylinder-defining body of the catalyzing air compressor 12 establishes the oxidation catalytic treatment stage compartment 23 defined within the body. It should be appreciated that the catalyzing air compressor 12 is only schematically represented in FIG. 3, but the details of the device can be better appreciated in the depiction of FIG. 2.

Preferably, and as illustrated, the oxidation catalyst 10 is located in the oxidation catalytic treatment stage compartment 23. As shown, the oxidation catalytic treatment stage compartment 23 is fit into a space defined in a cylinder head 14 of the cylinder-defining body at a compressed air outlet 22 from a defined cylinder 15 of the catalyzing air compressor 12.

In the illustration of FIG. 3, the oxidation catalytic treatment stage compartment 23 and the oxidation catalyst 10 are located downstream from an exhaust valve 21 associated with a compression cylinder 15 of the catalyzing air compressor 12. The exhaust valve 21 is preferably lamella-based in a reed-type valve configuration.

As discussed hereinabove, the receiving space 35 available for such a catalyzing air compressor 12 is always limited, but the specific configuration is normally dictated by packaging concerns within a receiving compartment, such as a trucks engine compartment. Therefore, in the embodiment illustrated in FIG. 3, the interior space of the receiving space or compartment 35 is sufficiently large to accommodate an integrally constructed catalyzing air compressor with an oxidation catalytic treatment stage compartment 12 configured according to the teachings disclosed herein, but the interior of the receiving space 35 available for the compressor 12 is sufficiently small to preclude installation of a non-integrally constructed air compressor and oxidation catalytic treatment stage compartment therein.

The invention is not limited to the embodiments described above, but may be varied within the scope of the appended claims. For example, the invention can be utilized in various types of vehicles, for example, passenger cars, lorries or heavy trucks, loaders and buses, which comprise a compressor for generating compressed air to a compressed air system.

Furthermore, the outlet port 22 and the exhaust valve 21 can suitably be formed in such manner that the flow of air through the space 23 is distributed to the respective catalyst unit in a manner that is suitable as regards the flow.

The invention can be implemented with various types of compressors; for instance, a compressor of the type that comprises two pistons with two sets of admission valves and exhaust valves.

What is claimed is:

1. A method for providing a compressed air system in a vehicle, said method comprising:

generating compressed air by means of a compressor;

feeding compressed air generated by the compressor to a compressed air consuming system in the vehicle;

purifying the generated compressed air in an oxidation catalyst positioned in direct connection with an outlet of the compressor, the air being purified by the oxidation catalyst being fed to the compressed air consuming system; and conducting the purification of compressed air utilizing a combined compressor and catalyst device in which the oxidation catalyst is integrally arranged within the compressor.

2. The method as recited in claim 1, further comprising:

providing a device for generating and purifying the compressed air, the device comprising a compressor and an oxidation catalyst, the oxidation catalyst being adapted for purifying the generated compressed air in direct connection with an outlet of the compressor, the oxidation catalyst being integrally arranged within the compressor and together with the compressor constitutes a combined compressor and catalyst device.

3. An arrangement for incorporating a catalyst directly into a compressor of a compressed air system in a vehicle, said arrangement comprising:

a compressor for generating compressed air and a connection for conveying compressed air generated by the compressor to a remaining portion of a compressed air system of a vehicle; and an oxidation catalyst adapted for purifying generated compressed air, said oxidation catalyst being integrally arranged within the compressor thereby establishing a combined compressor and catalytic device.

4. The arrangement as recited in claim 1, wherein the oxidation catalyst is fit into a space defined in a cylinder head at an outlet of the compressor.

5. The arrangement as recited in claim 1, wherein the oxidation catalyst further comprises a plurality of separate catalyst units, each with catalytically active material.

6. The arrangement as recited in claim 1, wherein the compressor is mechanically connected to a diesel engine.

7. The arrangement as recited in claim 1, further comprising:

a temperature control means for controlling the temperature of compressed air generated by the compressor.

8. The arrangement as recited in claim 7, wherein the temperature control means comprises an electric heating device.

9. The arrangement as recited in claim 7, wherein the temperature control means comprises a cooling device.

10. An arrangement for establishing a vehicular transported compressor that integrally incorporates a catalyst within the compressor, said arrangement comprising:

a vehicle having a receiving space for a catalyzing air compressor, said receiving space being configured to accommodate an integrally constructed air compressor with an oxidation catalytic treatment stage confined within said air compressor for purifying generated air; and a catalyzing air compressor having a cylinder-defining body located in said receiving space, said cylinder-defining body of said catalyzing air compressor having an oxidation catalytic treatment stage compartment defined within said body.

11. The arrangement as recited in claim 10, further comprising:

an oxidation catalyst being located in said oxidation catalytic treatment stage compartment; and said oxidation catalytic treatment stage compartment being fit into a space defined in a cylinder head of the cylinder-defining body at a compressed air outlet from a defined cylinder of said catalyzing air compressor.

12. The arrangement as recited in claim 11, further comprising:

said oxidation catalytic treatment stage compartment and said oxidation catalyst being located downstream from a lamella-based exhaust valve associated with a compression cylinder of said catalyzing air compressor.

13. The arrangement as recited in claim 10, further comprising:

said oxidation catalytic treatment stage compartment and said oxidation catalyst being located downstream from a lamella-based exhaust valve associated with a compression cylinder of said catalyzing air compressor.

14. The arrangement as recited in claim 13, further comprising:

said receiving space having an interior sufficiently large to accommodate an integrally constructed catalyzing air compressor with an oxidation catalytic treatment stage compartment, said interior of said receiving space further being sufficiently small to preclude installation of a non-integrally constructed air compressor and oxidation catalytic treatment stage compartment therein.

* * * * *